United States Patent
Nanu et al.

(10) Patent No.: US 8,503,818 B2
(45) Date of Patent: Aug. 6, 2013

(54) EYE DEFECT DETECTION IN INTERNATIONAL STANDARDS ORGANIZATION IMAGES

(75) Inventors: Florin Nanu, Bucharest (RO); Peter Corcoran, Claregalway (IE); Petronel Bigioi, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 1401 days.

(21) Appl. No.: 11/861,257

(22) Filed: Sep. 25, 2007

(65) Prior Publication Data

US 2009/0080797 A1    Mar. 26, 2009

(51) Int. Cl.
*G06K 9/40*    (2006.01)
(52) U.S. Cl.
USPC .......................................... 382/275; 382/254
(58) Field of Classification Search
None
See application file for complete search history.

(56) References Cited

U.S. PATENT DOCUMENTS

| | | |
|---|---|---|
| 4,285,588 A | 8/1981 | Mir |
| 4,577,219 A | 3/1986 | Klie et al. |
| 4,646,134 A | 2/1987 | Komatsu et al. |
| 4,777,620 A | 10/1988 | Shimoni et al. |
| 4,881,067 A | 11/1989 | Watanabe et al. |
| 4,978,989 A | 12/1990 | Nakano et al. |
| 5,016,107 A | 5/1991 | Sasson et al. |
| 5,070,355 A | 12/1991 | Inoue et al. |
| 5,130,789 A | 7/1992 | Dobbs et al. |
| 5,164,831 A | 11/1992 | Kuchta et al. |
| 5,164,833 A | 11/1992 | Aoki |
| 5,202,720 A | 4/1993 | Fujino et al. |
| 5,231,674 A | 7/1993 | Cleveland et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |

(Continued)

FOREIGN PATENT DOCUMENTS

| | | |
|---|---|---|
| EP | 884694 A1 | 12/1998 |
| EP | 911759 A2 | 4/1999 |
| EP | 911759 A3 | 6/2000 |
| EP | 1199672 A2 | 4/2002 |
| EP | 1229486 A1 | 8/2002 |

(Continued)

OTHER PUBLICATIONS

Viola et al., "Robust Real-time Object Detection", International Workshop on Statistical and Computation Theories of Vision, Jul. 2001.*

(Continued)

*Primary Examiner* — Li Liu
(74) *Attorney, Agent, or Firm* — Andrew V. Smith

(57) ABSTRACT

A method and apparatus for providing image processing. For one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

40 Claims, 3 Drawing Sheets

U.S. PATENT DOCUMENTS

| | | | |
|---|---|---|---|
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,678,073 A | 10/1997 | Stephenson, III et al. |
| 5,694,926 A | 12/1997 | DeVries et al. |
| 5,708,866 A | 1/1998 | Leonard |
| 5,719,639 A | 2/1998 | Imamura |
| 5,719,951 A | 2/1998 | Shackleton et al. |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,125,213 A | 9/2000 | Morimoto |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,631,208 B1 | 10/2003 | Kinjo et al. |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,643 B2 | 4/2006 | Comaniciu et al. |
| 7,027,662 B2 | 4/2006 | Baron |
| 7,030,927 B2 | 4/2006 | Sasaki |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | DeLuca |
| 7,062,086 B2 | 6/2006 | Chen et al. |
| 7,116,820 B2 | 10/2006 | Luo et al. |
| 7,130,453 B2 | 10/2006 | Kondo et al. |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,269,292 B2 | 9/2007 | Steinberg |
| 7,289,664 B2 | 10/2007 | Enomoto |
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 7,567,707 B2 * | 7/2009 | Willamowski et al. ....... 382/167 |
| 7,574,069 B2 | 8/2009 | Setlur et al. |
| 7,593,603 B1 | 9/2009 | Wilensky |
| 7,613,332 B2 | 11/2009 | Enomoto et al. |
| 7,630,006 B2 | 12/2009 | DeLuca et al. |
| 7,657,060 B2 | 2/2010 | Cohen et al. |
| 7,702,149 B2 | 4/2010 | Ohkubo et al. |
| 7,747,071 B2 | 6/2010 | Yen et al. |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |
| 2002/0089514 A1 | 7/2002 | Kitahara et al. |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0102024 A1 * | 8/2002 | Jones et al. ................... 382/225 |

| | | |
|---|---|---|
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150292 A1 | 10/2002 | O'callaghan |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0039402 A1 | 2/2003 | Robins et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0086134 A1 | 5/2003 | Enomoto |
| 2003/0086164 A1 | 5/2003 | Abe |
| 2003/0095197 A1* | 5/2003 | Wheeler et al. ............... 348/241 |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0041924 A1 | 3/2004 | White et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0109614 A1 | 6/2004 | Enomoto et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238217 A1* | 10/2005 | Enomoto et al. ............... 382/128 |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0126938 A1* | 6/2006 | Lee et al. ...................... 382/190 |
| 2006/0140455 A1 | 6/2006 | Costache et al. |
| 2006/0150089 A1 | 7/2006 | Jensen et al. |
| 2006/0203108 A1 | 9/2006 | Steinberg et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0280361 A1 | 12/2006 | Umeda |
| 2006/0280375 A1 | 12/2006 | Dalton et al. |
| 2006/0285754 A1 | 12/2006 | Steinberg et al. |
| 2007/0098260 A1 | 5/2007 | Yen et al. |
| 2007/0110305 A1 | 5/2007 | Corcoran et al. |
| 2007/0116379 A1 | 5/2007 | Corcoran et al. |
| 2007/0116380 A1* | 5/2007 | Ciuc et al. ...................... 382/275 |
| 2007/0133863 A1 | 6/2007 | Sakai et al. |
| 2007/0154189 A1 | 7/2007 | Harradine et al. |
| 2007/0201724 A1 | 8/2007 | Steinberg et al. |
| 2007/0263104 A1 | 11/2007 | DeLuca et al. |
| 2007/0263928 A1 | 11/2007 | Akahori |
| 2008/0002060 A1 | 1/2008 | DeLuca et al. |
| 2008/0013798 A1 | 1/2008 | Ionita et al. |
| 2008/0043121 A1 | 2/2008 | Prilutsky et al. |

| | | | |
|---|---|---|---|
| 2008/0112599 | A1 | 5/2008 | Capata et al. |
| 2008/0144965 | A1 | 6/2008 | Steinberg et al. |
| 2008/0186389 | A1 | 8/2008 | DeLuca et al. |
| 2008/0211937 | A1 | 9/2008 | Steinberg et al. |
| 2008/0219518 | A1 | 9/2008 | Steinberg et al. |
| 2008/0232711 | A1 | 9/2008 | Prilutsky et al. |
| 2008/0240555 | A1 | 10/2008 | Nanu et al. |
| 2011/0222730 | A1 | 9/2011 | Steinberg et al. |

FOREIGN PATENT DOCUMENTS

| | | | |
|---|---|---|---|
| EP | 1288858 A1 | 3/2003 | |
| EP | 1288859 A1 | 3/2003 | |
| EP | 1288860 A1 | 3/2003 | |
| EP | 1293933 A1 | 3/2003 | |
| EP | 1296510 A2 | 3/2003 | |
| EP | 1429290 A2 | 6/2004 | |
| EP | 1478169 A2 | 11/2004 | |
| EP | 1528509 A2 | 5/2005 | |
| EP | 979487 B1 | 3/2006 | |
| EP | 1429290 B1 | 7/2008 | |
| EP | 2227002 A2 | 9/2008 | |
| EP | 2165523 B1 | 4/2011 | |
| GB | 841609 A | 7/1960 | |
| JP | 3-205989 A | 9/1991 | |
| JP | 3205989 A2 | 9/1991 | |
| JP | 4192681 A2 | 7/1992 | |
| JP | 5224271 A2 | 9/1993 | |
| JP | 7-281285 A | 10/1995 | |
| JP | 7281285 A2 | 10/1995 | |
| JP | 9214839 A2 | 8/1997 | |
| JP | 20134486 A2 | 5/2000 | |
| JP | 22247596 A2 | 8/2002 | |
| JP | 22271808 A2 | 9/2002 | |
| JP | 2003-030647 A | 1/2003 | |
| JP | 2003-030647 A2 | 1/2003 | |
| WO | WO-9802844 A1 | 1/1998 | |
| WO | WO-9917254 A1 | 4/1999 | |
| WO | WO-9933684 A2 | 7/1999 | |
| WO | WO-0171421 A1 | 9/2001 | |
| WO | WO-0192614 A1 | 12/2001 | |
| WO | WO-0245003 A1 | 6/2002 | |
| WO | WO03/019473 A1 | 3/2003 | |
| WO | WO-03026278 A1 | 3/2003 | |
| WO | WO-03071484 A1 | 8/2003 | |
| WO | WO-2004034696 A1 | 4/2004 | |
| WO | WO2005/015896 A1 | 2/2005 | |
| WO | WO-2005015896 A1 | 2/2005 | |
| WO | WO-2005041558 A1 | 2/2005 | |
| WO | WO2005/076217 A2 | 8/2005 | |
| WO | WO-2005072617 A3 | 8/2005 | |
| WO | WO-2005076217 A2 | 8/2005 | |
| WO | WO-2005087994 A1 | 9/2005 | |
| WO | WO2005/076217 A9 | 10/2005 | |
| WO | WO-2005109853 A1 | 11/2005 | |
| WO | WO-2006011635 A1 | 2/2006 | |
| WO | WO-2006018056 A1 | 2/2006 | |
| WO | WO2005/076217 A3 | 4/2006 | |
| WO | WO-2006045441 A1 | 5/2006 | |
| WO | WO-2007057063 A1 | 5/2007 | |
| WO | WO-2007057064 A1 | 5/2007 | |
| WO | WO-2007093199 A2 | 8/2007 | |
| WO | WO-2007093199 A3 | 8/2007 | |
| WO | WO-2007095553 A2 | 8/2007 | |
| WO | WO-2007095553 A3 | 8/2007 | |
| WO | WO-2007142621 A1 | 12/2007 | |
| WO | WO-2008023280 A2 | 2/2008 | |
| WO | WO2008/109708 A1 | 9/2008 | |
| WO | WO-2008109644 A2 | 9/2008 | |
| WO | WO-2008109644 A3 | 9/2008 | |
| WO | WO 2010/017953 A1 | 2/2010 | |
| WO | WO2010/017953 A1 | 2/2010 | |
| WO | WO2010017953 A1 | 2/2010 | |
| WO | WO 2010/025908 A1 | 3/2010 | |
| WO | WO2010025908 A1 | 3/2010 | |

OTHER PUBLICATIONS

Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering. Society of Photo-Optical Instrumentation. 1995, pp. 301-312.

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Examination Report for European patent application No. 05792584.4, dated May 13, 2008, 8 pgs.

Gaubatz, Matthew et al., "Automatic Red-Eye Detection and Correction", IEEE ICIP, Proceedings 2002 Intl Conference on Image Proc, 2002, pp. 1-804-1-807, vol. 2—Issue 3.

Han, T. et al., "Detection and Correction of abnormal Pixels in Hyperion Images", IEEE International Symposium on Geoscience and Remote Sensing, 2002. pp. 1327-1330. vol. 3.

Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.

Ioffe, S., "Red eye detection with machine learning", Proceedings 2003 International Conference on Image Processing, 2003, pp. 871-874. vol. 2—Issue 3.

Ito, M., "An Automated System for LSI Fine Pattern Inspection Based on Comparison of Sem Images and Cad Data", IEEE International Conference on Robotics and Automation, 1995, pp. 544-549, vol. 1.

Jin, B. et al., "Modeling and Analysis of Soft-Test/Repair for CCD-Based Digital X-Ray Systems", Instrumentation and Measurement, IEEE Trans, 2003, pp. 1713-1721, vol. 52—Issue 6.

Nguyen, Karlene et al., "Differences in the Infrared Bright Pupil Response of Human Eyes", Proceedings of the 2002 symposium on Eye tracking research and applications, 2002, pp. 133-138.

Patent Abstracts of Japan, publication No. 2000050062, Image Input Device, application No. 10-217124. published, Feb. 18, 2000, 1 page.

PCT International Preliminary Report on Patentability (IPRP) for PCT Application PCT/EP2005/011010, dated Jan. 23, 2007, 18 pages.

PCT International Preliminary Report on Patentability for PCT Application No. PCT/EP2005/005907, dated Nov. 15, 2006, 8 pages.

PCT International Preliminary Report on Patentability for PCT Application PCT/EP2004/008706, dated Feb. 6, 2006, 7 pages.

PCT International Preliminary Report on Patentability for PCT Application PCT/EP2004/010199, dated Apr. 3, 2006, 7 pages.

PCT International Search Report and the Written Opinion of the International Searching Authority, or the Declaration, for PCT Application No. PCT/US2008/055864, dated Jul. 30, 2008, 8 pages.

PCT International Search Report and Written Opinion of the International Searching Authority for PCT Application No. PCT/EP2004/008706, dated Nov. 19, 2004, 13 pages.

PCT International Search Report and Written Opinion of the International Searching Authority for PCT Application No. PCT/EP2005/005033.

PCT Notification Concerning Transmittal of International Preliminary Report on Patentability, for PCT Application No. PCT/US2007/062090, dated Aug. 28, 2008, 6 pages.

PCT Notification of Transmittal of the International Search Report and the Written Opinion of the International Searching Authority, or the Declaration (PCT/EP2006/008342), dated Dec. 28, 2006.

PCT Notification of Transmittal of the International Search Report and the Written Opinion of the International Searching Authority, or the Declaration for PCT Application No. PCT/US07/62090 issued Mar. 10, 2008, 10 pages.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration for PCT/EP/2005/05907, dated Aug. 1, 2005, 12 pages.

PCT Notification of Transmittal of the International Search Report and the Written Opinion of the International Searching Authority, or the Declaration, for PCT Application No. PCT/EP2006/008358, Dec. 5, 2006, 14 pages.

PCT Notification of Transmittal of the International Search Report and the Written Opinion of the International Searching Authority, or the Declaration, for PCT Application No. PCT/US2008/055964, paper dated Jul. 30, 2008, 8 Pages.

PCT Notification of Transmittal of the International Search Report and the Written Opinion of the International Searching Authority, or the Declaration, for PCT/EP2004/010199, paper dated Dec. 13, 2004, 13 pages.

PCT Notification of Transmittal of the International Search Report and Written Opinion of the International Searching Authority for PCT Application No. PCT/EP2005/001171, (11 pages).

Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.

Plotnikov, Yuri et al., Winfree, "Visualization of Subsurface Defects in Composites Using a Focal Plane Array Infrared Camera . http://citeseer.ist.psu.edu/357066.html", NASA Langley Research Center, 1999.

Sahba. F. et al., "Filter Fusion for Image Enhancement Using Reinforcement Learning, XP010654204, ISBN: 0-7803-7781-8", Canadian Conference on Electrical and computer Engineering. 2003, pp. 847-850, vol. 3.

Shen, Jianhong, "Inpainting and the Fundamental Problem of image Processing", 2002, 6 pages.

Smolka, B. et al., "Towards Automatic Redeye Effect Removal. XP004416063". Pattern Recognition Letters, 2003, pp. 1767-1785, vol. 24—Issue 11, North-Holland Publ.

Soriano, M. et al., "Making Saturated Facial Images Useful Again, XP002325961, ISSN: 0277-786X", Proceedings of the Spie, 1999, pp. 113-121, vol. 3826.

Tan, Yap-peng et al., "Robust Sequential Approach for the Detection of Defective Pixels in an Image Sensor, http:// ieeexplorejeee.org/search/freesrchabstract.jsp?arnumber=758382
andisnumber=16342andpunumber=6110andk2dock ey=758382©ieeecnfsandquery=%28%28%28%28images+and+defects+and+correction%29%29%29%29+%3Cin%3E", IEEE International Conference on Acoustics, Speech, and Signal Processing, 1999, pp. 2239-2242, vol. 4.

Toet, A., "Multiscale Color Image Enhancement, Posted online: Aug. 6, 2002 18:09:24.0 http://ieeexplore.ieee.org/search/freesrchabstract.jsp?arnumber=146865andisnumber=3917andpunumber=1197andk2dockey=146865©ieecnfsandquery=%28%28images+and+defects+and+luminance%29%29+%3Cin%3E+metadataandpos=1", International Conference on Image Processing and its Applications, 1992, pp. 583-585.

U.S. Appl. No. 10/772,767, filed Feb. 4, 2004, by invs Michael J. DeLuca, et al.

U.S. Appl. No. 10/170,511, filed Jun. 12, 2002, inventor Michael J. DeLuca.

U.S. Appl. No. 11/217,788, filed Aug. 30, 2005, inventors Eran Steinberg, et al.

United Kingdom Search Report dated May 22, 2007, issued in Application No. GB 0701957.3.

Willamowski. J. et al., "Probabilistic Automatic Red Eye Detection and Correction", The 18th International Conference on Pattern Recognition (ICPR'06), 2006, pp. 762-765, vol. 3, IEEE Computer Society.

Non-Final Office Action mailed May. 3, 2010, for U.S. Appl. No. 12/187,763, filed Aug. 7, 2008.

PCT Notification of Transmittal of the International Search Report and the Written Opinion of the International Searching Authority, or the Declaration, for PCT Application No. PCT/EP2009/006361, dated Nov. 24, 2009, 10 pages.

PCT Invitation to Pay Additional Fees for Application No. PCT/EP2009/051081, dated Apr. 29, 2009, 7 pages.

Agrawal A. et al., "Removing photography artifacts using gradient projection and flash-exposure sampling" ACM Transactions on Graphics , 2005, pp. 828-835.

Final Office Action mailed Apr. 26, 2010, for U.S. Appl. No. 10/773,092, filed Feb. 4, 2004.

Final Office Action mailed Apr. 26, 2010, for U.S. Appl. No. 11/690,834, filed Mar. 25, 2007.

Final Office Action mailed Apr. 26, 2010, for U.S. Appl. No. 11/772,427, filed Feb. 2, 2007.

Final Office Action mailed Apr. 26, 2010, for U.S. Appl. No. 12/035,416, filed Feb. 21, 2008.

Final Office Action mailed Mar. 24, 2010, for U.S. Appl. No. 11/462,035, filed Aug. 2, 2006.

Final Office Action mailed Nov. 9, 2010, for U.S. Appl. No. 11/462,035, filed Aug. 2, 2006.

Final Office Action mailed Nov. 20, 2009, for U.S. Appl. No. 12/192,897, filed Aug. 15, 2008.

Final Office Action mailed Sep. 1, 2009, for U.S. Appl. No. 11/841,855, filed Aug. 20, 2007.

Non-Final Office Action mailed Aug. 30, 2010, for U.S. Appl. No. 11/841,855, filed Aug. 20, 2007.

Non-Final Office Action mailed Aug. 31, 2009, for U.S. Appl. No. 11/462,035, filed Aug. 2, 2006.

Non-Final Office Action mailed Aug. 5, 2010, for U.S. Appl. No. 11/462,035, filed Aug. 2, 2006.

Non-Final Office Action mailed Jul. 14, 2009, for U.S. Appl. No. 12/192,897, filed Aug. 15, 2008.

Non-Final Office Action mailed May 3, 2010, for U.S. Appl. No. 12/187,763, filed Aug. 7, 2008.

Non-Final Office Action mailed May 4, 2010, for U.S. Appl. No. 12/192,335, filed Aug. 15, 2008.

Non-Final Office Action mailed Oct. 5, 2009, for U.S. Appl. No. 10/919,226, filed Aug. 16, 2004.

Non-Final Office Action mailed Oct. 7, 2009, for U.S. Appl. No. 12/119,614, filed May 13, 2008.

Non-Final Office Action mailed Oct. 29, 2009, for U.S. Appl. No. 12/194,148, filed Aug. 19, 2008.

Non-Final Office Action mailed Sep. 17, 2010, for U.S. Appl. No. 11/690,834, filed Mar. 25, 2007.

Non-Final Office Action mailed Sep. 21, 2010, for U.S. Appl. No. 10/773,092, filed Feb. 4, 2004.

Notice of Allowance mailed Dec. 10, 2010, for U.S. Appl. No. 11/462,035, filed Aug. 2, 2006.

Notice of Allowance mailed Feb. 1, 2010, for U.S. Appl. No. 10/919,226, filed Aug. 16, 2004.

Notice of Allowance mailed Feb. 19, 2010, for U.S. Appl. No. 12/119,614, filed May 13, 2008.

Notice of Allowance mailed Feb. 19, 2010, for U.S. Appl. No. 12/194,148, filed Aug. 19, 2008.

Notice of Allowance mailed Jun. 27, 2010, for U.S. Appl. No. 12/192,897, filed Aug. 15, 2008.

Notice of Allowance mailed Nov. 18, 2009, for U.S. Appl. No. 11/282,954, filed Nov. 18, 2005.

Notice of Allowance mailed Oct. 15, 2010, for U.S. Appl. No. 11/554,539, filed Oct. 30, 2006.

Notice of Allowance mailed Oct. 22, 2010, for U.S. Appl. No. 12/187,763, filed Aug. 7, 2008.

Notice of Allowance mailed Oct. 28, 2010, for U.S. Appl. No. 12/192,335, filed Aug. 15, 2008.

Notice of Allowance mailed Oct. 28, 2010, for U.S. Appl. No. 11/690,834, filed Mar. 25, 2007.

PCT Notification of Transmittal of the International Search Report and the Written Opinion of the International Searching Authority, or the Declaration, for PCT Application No. PCT/EP2009/005809, dated Nov. 24, 2009, 12 pages.

PCT Notification of Transmittal of the International Search Report and the Written Opinion of the International Searching Authority, or the Declaration, for PCT Application No. PCT/EP2009/006361, dated Nov. 11, 2009, 10 pages.

PCT Partial International Search Report for Application No. PCT/EP2009/051081, dated Apr. 29, 2009, 7 pages.

Tatsutoshi Kitajima (JP04-192681 English Translation; Electronic Camera, Jul. 10, 1992).

Translation of Hiroshi et al. JP05-224271, Mar. 1993, Japan Publication.

Final Office Action mailed Feb. 1, 2011, for U.S. Appl. No. 10/773,092, filed Feb. 4, 2004.

Corinne Vachier, Luc Vincent, Valuation of Image Extrema Using Alternating Filters by Reconstruction, Proceedings of the SPIE—The International Society for Optical Engineering, 1995, vol. 2568, pp. 94-103.

EPO Communication pursuant to Article 94(3) EPC, for European patent application No. 05707215.9, report dated Sep. 14, 2010, 11 Pages.

EPO Communication under Rule 71(3) EPC, for European patent application No. 09706058.6, report dated Oct. 4, 2010, 6 Pages.

EPO Extended European Search Report, for European application No. 10164430.0, dated Sep. 6, 2010, including the extended European search report, pursuant to Rule 62 EPC, the European search report (R. 61 EPC) or the partial European search report/declaration of no search (R. 63 EPC) and the European search opinion, 8 pages.

PCT Notification of Transmittal of the International Search Report and the Written Opinion of the International Searching Authority, or the Declaration, for PCT Application No. PCT/US2008/055964, dated Jul. 30, 2008, 8 pages.

PCT Written Opinion of the International Searching Authority, for PCT Application No. PCT/US2008/055964, dated Jul. 24, 2008, 5 pages.

PCT International Preliminary Report on Patentability for PCT Application No. PCT/US2008/055964, dated Sep. 8, 2009, 6 pages.

Cuiping Zhang and Fernand S. Cohen, Component-Based Active Appearance Models for Face Modelling, D. Zhang and A.K. Jain (Eds.): ICB 2006, LNCS 3832, pp. 206-212, 2005, Springer-Verlag Berlin Heidelberg 2005.

Fundus Photograph Reading Center—Modified 3-Standard Field Color Fundus Photography and Fluorescein Angiography Procedure, Retrieved from the Internet on Oct. 19, 2011, URL: http://eyephoto.ophth.wisc.edu/Photography/Protocols/mod3-ver1.4.html, 3 Pages.

Anatomy of the Eye, Retrieved from the Internet on Oct. 19, 2011, URL: http://www.stlukeseye.com/anatomy, 3 pages.

*Fovea centralis*, Retrieved from the Internet on Oct. 19, 2011, URL: http://en.wikipedia.org/wiki/Fovea, 4 pages.

Non-Final Office Action mailed Apr. 28, 2011, for U.S. Appl. No. 11/936,085, filed Nov. 7, 2007.

Non-Final Office Action mailed Apr. 28, 2011, for U.S. Appl. No. 11/937,377, filed Nov. 8, 2007.

Non-Final Office Action mailed Mar. 31, 2011, for U.S. Appl. No. 12/551,312, filed Aug. 31, 2009.

Non-Final Office Action mailed May 2, 2011, for U.S. Appl. No. 12/824,214, filed Jun. 27, 2010.

Notice of Allowance mailed Feb. 4, 2011, for U.S. Appl. No. 12/611,387, filed Nov. 3, 2009.

Notice of Allowance mailed Mar. 3, 2011, for U.S. Appl. No. 12/543,405, filed Aug. 18, 2009.

Final Office Action mailed Feb. 16, 2011, for U.S. Appl. No. 12/543,405, filed Aug. 18, 2009.

Final Office Action mailed Jan. 5, 2011, for U.S. Appl. No. 12/611,387, filed Nov. 3, 2009.

Notice of Allowance mailed May 12, 2011, for U.S. Appl. No. 12/043,025, filed Mar. 5, 2008.

Final Office Action mailed Feb. 2, 2011, for U.S. Appl. No. 12/613,457, filed Nov. 5, 2009.

Notice of Allowance mailed Mar. 17, 2011, for U.S. Appl. No. 12/042,335, filed Mar. 5, 2008.

Patent Abstracts of Japan, for Publication No. JP2002-247596, published Aug. 30, 2002, (Appl. No. 2001-044807), Program For Specifying Red Eye Area in Image, Image Processor and Recording Medium. 1 Page.

\* cited by examiner

EYE DEFECT DETECTION IN INTERNATIONAL STANDARDS ORGANIZATION IMAGES

FIELD

Embodiments of the invention relate generally to the field of image processing and more specifically to methods and apparatuses for improved eye defect detection in digital images.

BACKGROUND

Light sensitivity ratings conforming to the international standard set by the International Standards Organization (ISO) are known as ISO ratings and denote a sensitivity of an imaging sensor of an acquisition device to an amount of light present. In digital acquisition devices, altering the ISO rating is a means of exposure control, which affects shutter speed and/or lens aperture. The higher the ISO rating, the more sensitive the imaging sensor, thereby leading to increased exposure of an acquired image. However, as the light sensitivity increases, the imaging sensor is capable of recording a fainter light signal, and thus it will be susceptible to recording noise.

Noise produced by an imaging sensor is undesirable and can appear in an image as numerous small red-pixel cluster artifacts, also known as noise speckles. The presence of noise speckles in an image degrades the operation of conventional red eye detection methods, such as disclosed in U.S. Pat. No. 7,599,577. Conventional red eye detection methods involve segmenting and labeling pixels or groups of pixels of an image into candidate red-eye regions. When such red eye detection methods are applied to images having a high ISO rating, many of the noise speckles are initially mistaken for red eye defects, and as a result, the segmenting and labeling operations of the method become computationally burdensome.

It is known to apply a face tracker/detector, such as disclosed in International Patent Application No. PCT/EP2007/005330 (WO 2008/017343) and International Patent Application No. PCT/EP2007/006540 (WO 2008/107002), to limit the application of the red eye detection method to confirmed face regions. However, the presence of noise speckles can also affect the accuracy of face detection/tracking. Thus, such an approach could introduce a further degree of error resulting in less accurate red-eye detection.

Furthermore, the computational requirements involved in running typical face detection/tracking prior to running red-eye detection would degrade or limit the performance of the face detector/tracker, the red-eye detector or both, particularly when implemented on real time image acquisition devices.

SUMMARY

In accordance with one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

Other features and advantages of embodiments of the invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
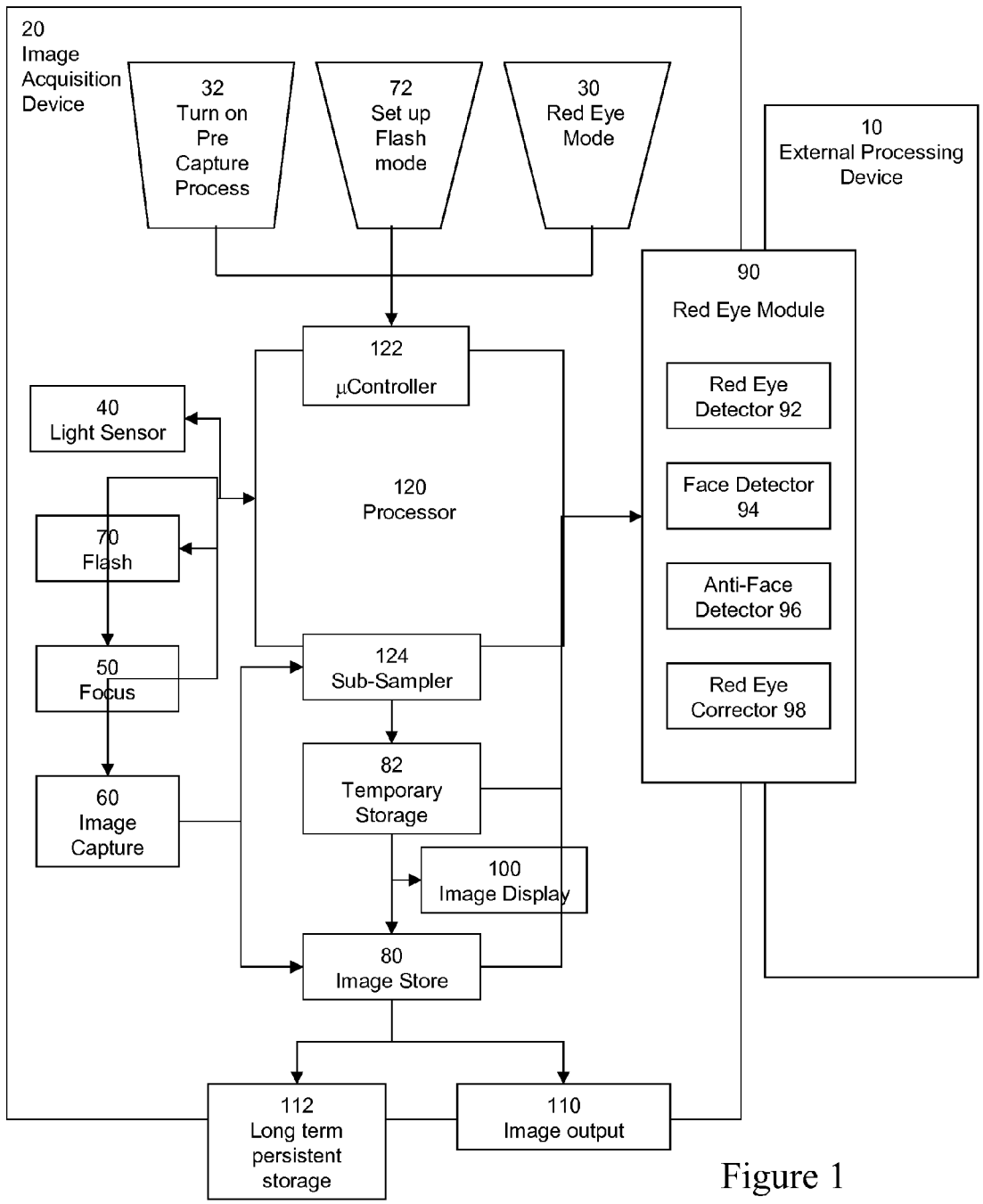
FIG. 1 illustrates a block diagram of an image acquisition device 20 operating in accordance with various alternative embodiments of the invention.

An image acquired with a flash may include red-eye defects. In general, these red-eye defects are detected by applying a conventional eye defect detector to the image. However images acquired with a high ISO rating, for example, greater than ISO 800, may include numerous small clusters of red-pixels indicative of noise and in such cases, the eye defect detector can identify the noise speckles as relatively small red eye defects.

Embodiments of the invention provide methods and apparatuses for detecting red eyes in high ISO flash images. For one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing is effected. As noted above, an image acquired with a flash may include red-eye defects. In general, these red-eye defects are detected by applying a conventional eye defect detector to the image. However images acquired with a high ISO rating, for example, greater than ISO 800, may include numerous small clusters of red-pixels indicative of noise and in such cases, the eye defect detector can identify the noise speckles as relatively small red eye defects.

In accordance with one embodiment of the invention, the effect of the noise speckles on the red eye defect detector can be mitigated by firstly applying anti-face detection to the image to eliminate regions of the image not comprising faces.

Face detection is well known in the art, for example as disclosed in US Patent Application No. 2002/0102024, hereinafter Viola-Jones. In Viola-Jones, a chain (cascade) typically comprising 32 classifiers based on rectangular (and increasingly refined) Haar features is used with an integral image, derived from an acquired image, by applying the classifiers to a sub-window within the integral image. For a complete analysis of an acquired image, this sub-window is shifted incrementally across the integral image until the entire image has been covered.

As the classifiers are increasingly more refined, the majority of non-face regions in an image are quickly eliminated after the first few classifiers in the cascade have been applied. Thus regions of an image that do not contain a face can be quickly and accurately determined. For example, in "Robust Real-Time Object Detection" Viola-Jones, Second International Workshop on Statistical and Computational Theories of Vision, Vancouver, July 2001, it is shown that it is possible to train a single two-feature classifier that will successfully detect 100% of faces with a 40% false positive rate. Thus, although 40% of the candidate face sub-windows it passes are not, in fact, face regions, practically 100% of the sub-windows it rejects are non-face regions.

In one embodiment of the invention, red eye detection of small red-eye defects is only applied to regions of an image not rejected by a relatively relaxed face detector, referred to herein as an anti-face detector. In this way, the computational efficiency and quality of the red-eye detection application can be improved.

FIG. 1 illustrates a block diagram of an image acquisition device 20 operating in accordance with various alternative embodiments of the invention. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labelled "processor". Generically, all user interface and control of peripheral components such as buttons and display is controlled by a microcontroller 122. The processor 120, in response to a user input at 122, such as half pressing a shutter button (pre-capture mode 32), initiates and controls the digital photographic process.

Ambient light exposure is monitored using light sensor 40 in order to automatically determine if a flash is to be used. A distance to the subject is determined using a focus component 50, which also focuses the image on image capture component 60. If a flash is to be used, processor 120 causes the flash 70 to generate a photographic flash in substantial coincidence with the recording of the image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is typically equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component.

For one embodiment, the camera 20 has a user-selectable red-eye mode 30 particularly for detecting and optionally correcting images, which have been acquired with a flash. A red eye module 90 analyzes and processes such images acquired from the image store 80 according to a workflow described below.

For one embodiment, the module 90 comprises a red-eye detector 92, a face detector 94, an anti-face detector 96 and a red-eye defect corrector 98, the operations of which will be described in more detail below. The module 90 can be integral to the camera 20, for one embodiment, module 90 could be the processor 120 with suitable programming—or part of an external processing device 10 such as a desktop computer.

Where the red eye module 90 is integral to the camera 20, the final processed image may be displayed on image display 100, saved on a persistent storage 112 which can be internal or a removable storage such as CF card, SD card or the like, or downloaded to another device, such as a personal computer, server or printer via image output means 110 which can be tethered or wireless. For various embodiments where the module 90 is implemented in an external device 10, such as a desktop computer, the final processed image may be returned to the camera 20 for storage and display as described above, or stored and displayed externally of the camera.

Figure 2:
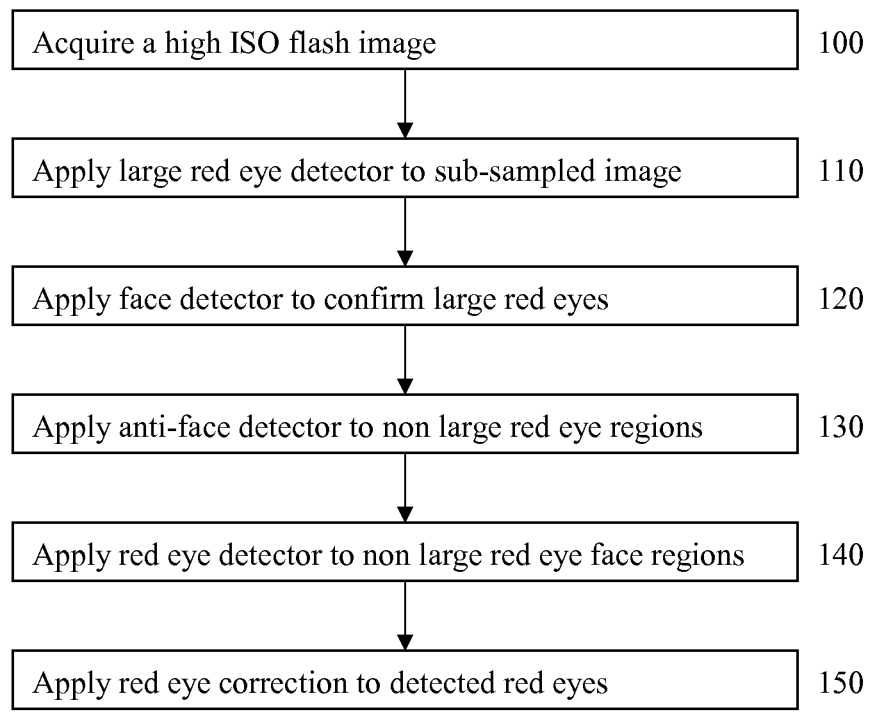
FIG. 2 illustrates a method for effecting red-eye detection in accordance with one embodiment of the invention.
Figure 3:
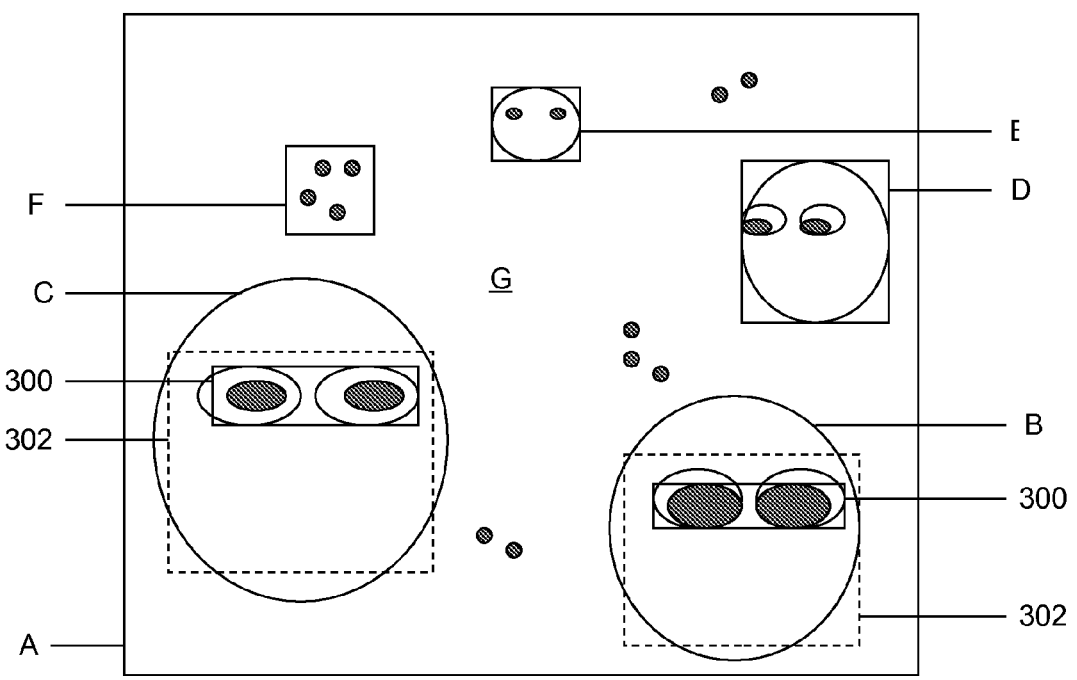
FIG. 3 illustrates a typical acquired image for which red-eye defect detection is effected in accordance with one embodiment of the invention.

FIG. 2 illustrates a method for effecting red-eye defect detection in accordance with one embodiment of the invention. At operation 100, a high ISO digital flash image is acquired in an otherwise conventional manner. A typical acquired image is described in FIG. 3. FIG. 3 illustrates a typical acquired image for which red-eye defect detection is effected in accordance with one embodiment of the invention. Image A, shown in FIG. 3, includes face regions, B and C, comprising relatively large red-eye defects, face regions, D and E, comprising relatively small red-eye defects, a face region F comprising a plurality of noise speckles F. The image A less the regions B-F comprises regions identifiably by a relaxed face detector as non-face regions, referred to herein as G.

For one embodiment of the invention, the image A is analyzed by the red-eye detector 92 to locate any relatively large red eye regions. Since the noise speckles appear in the image as relatively small red-pixel cluster artifacts, their presence does not largely affect the detection of large red eye defects. Thus, a standard red eye filter configured to locate relatively large red eye regions is applied to a sub-sampled version of the image, operation 110. Preferably the image is sub-sampled to 1024×768. However, it will be appreciated that the image may be sub-sampled to a greater degree, for example to 256×192.

As illustrated in FIG. 3, any candidate large red eye defect region 300 is bounded by a border (not necessarily rectangular), and for one embodiment, a boundary region 302 (not necessarily rectangular) is defined to include the border and a portion of the face surrounding the candidate region.

Referring again to FIG. 2, a conventional face detector 94 is preferably applied to a region including any detected boundary regions 302 in order to confirm the red eyes and identify surrounding face regions, operation 120.

The anti-face detector 96, which eliminates non-face regions of an image, is then applied to the full size image A.

For one embodiment, the anti-face detector 96 is applied to the full size image across a restricted range of scales. For example, the restricted range of scales may be based on anthropometric data and/or a size range of the noise speckles vis-à-vis the expected size of smaller red-eye defects, which might appear in an image. So for example, the smallest window size employed by the detector 96 could be determined by the smallest size face in an image for which there is a requirement to detect and correct red-eye defects, whereas the largest size window could be set as not exceeding the smallest sized face detected by the detector 94 in operation, 120.

More specifically, the smallest size of face is a function of the camera subsystem, the flash subsystem and the level of ambient lighting during image capture. Thus a camera with a stronger flash will generate red-eye effect in faces which are more distant from the camera and thus a smaller face size criteria should be used for such a camera. Similarly a higher level of ambient lighting will reduce the range at which red-eyes occur. Camera optics and sensor sensitivity will also determine the size threshold for the smallest face detector.

Typically no more than 4-5 sizes of face detector window would be employed (further granularity would reduce the speed of the detector) and typically decisions determined from the ambient lighting, lens configuration, exposure settings and flash strength would only affect the use of the 1-2 smallest size of face detector window.

As the combination of optics, sensor, lens and flash subsystems are quite unique to most models of digital camera an empirical calibration of this smallest size window threshold is typically required although it is possible to share calibration data between cameras with well-defined subsystem characteristics. Due to its non-linear nature this data is typically stored within the camera firmware as a set of look-up tables.

For one embodiment, the anti-face detector is an inverted face detector comprising a single two feature classifier with a 40% false positive rate as disclosed in the Viola-Jones paper referred to above.

An alternative method of face detection is described in US 2006/126,938, which discloses employing a measure of variance in an image sub-window to determine if the sub-window could possibly contain a face. If the variance of the sub-window lies below a particular threshold, a face cannot be detected, and the sub-window is rejected as not comprising a face.

As such, in an alternative implementation of the invention, a classifier based on variance of any sub-window within an image can be employed to quickly eliminate regions of an image not containing a face.

It will be appreciated that this variance based technique may be combined with the relatively relaxed Viola Jones face detector to improve the accuracy and/or speed of the anti-face detector.

For one embodiment, the anti-face detector 96 is applied to portions of the image A excluding large red eye face regions (B+C) confirmed by the face detector of operation 120, i.e. region (A−(B+C)), in order to eliminate non-face regions (A−(B+C+D+E+F)) of the image. However, it will also be appreciated that the anti-face detector 96 may be applied to the whole acquired image A.

Although almost 100% of the sub-windows passed by the anti-face detector are non-face regions, it is likely that some non-face regions F will not be eliminated by the anti-face detector 96.

For one embodiment, the red eye detector 92 is then applied to any regions of the image which were not eliminated by the anti-face detector of operation 130 as being non-face regions, and preferably excluding those regions confirmed as large red eye face regions in operation 120, for example, regions D+E+F in FIG. 3, in order to locate relatively small red eye defects, operation 140. It is understood that if no regions remain after the application of the anti-face detector 96, the red-eye defect detector 96 configured to detect relatively small red eye defects is not applied to the image.

In this way, any noise speckles in non-face regions eliminated by the anti-face detector 96, i.e. region (A−(B+C+D+E+F)), are not subjected to the red eye detection of operation 140, but face regions as well as non-face regions un-eliminated by the anti-face detector, i.e. region F, are subjected to the red eye detection of operation 140.

Thus, the regions of the image to which red eye detection is applied are significantly reduced, thereby increasing the computational efficiency of running the red eye detection application on a high ISO image. Furthermore, the probability of the red eye detector mistakenly identifying noise speckles as small red eye defects is reduced.

For one embodiment, the red eye defect corrector 98, such as that disclosed in U.S. Pat. No. 7,599,577 is applied to those relatively large and relatively small red eye defect regions to correct the image, operation 150.

In an alternative embodiment of the invention, the operations of FIG. 1 are carried out only if the image was acquired with an ISO sensitivity of greater than or equal to 800.

General Matters

Embodiments of the invention include apparatuses and methods for effecting red-eye defect detection. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for digital image red eye defect detection comprising:
   using a processor;
   acquiring a digital image;
   identifying one or more relatively large candidate red eye defect regions in at least a portion of said image, including using a first red eye detector not configured to detect one or more relatively small candidate red eye defect regions;
   applying anti-face detection to at least a portion of said image not including said one or more relatively large candidate red eye defect regions to eliminate non-face regions; and
   identifying said one or more relatively small candidate red eye defect regions both (a) with a second red eye detector configured to detect said one or more relatively small candidate red eye defect regions, and (b) in a portion of said image including neither (i) said eliminated non-face regions nor (ii) said one or more relatively large candidate red eye defect regions.

2. The method of claim 1 wherein the identifying one or more relatively large candidate red eye defect regions is carried out on a sub-sampled version of said image.

3. The method of claim 2 comprising applying relatively more rigorous face detection compared to said applying face detection to confirm said one or more large candidate red-eye defect regions.

4. The method of claim 3 wherein said applying face detection comprises applying relatively relaxed face detection to said at least a portion of said image compared with said applying relatively rigorous face detection.

5. The method of claim 4 wherein said applying relatively relaxed face detection comprises applying a chain of about two classifiers to said at least a portion of said image.

6. The method of claim 4 wherein said relatively relaxed face detection has a false positive rate of approximately 40%.

7. The method of claim 4, wherein the applying relatively relaxed face detection comprises comparing a variance of at least a portion of the image with a threshold and responsive to the variance being less than the threshold, eliminating the portion.

8. The method of claim 1 further comprising correcting said relatively large candidate red eye defect regions and said relatively small candidate red eye defect regions.

9. The method of claim 1 wherein the applying anti-face detection comprises applying an anti-face detector to said image to identify those regions of the image which do not contain faces and labelling the remaining regions of the image as candidate face regions.

10. The method of claim 1 further comprising determining to apply the identifying one or more relatively large candidate red eye defect regions, applying anti-face detection and identifying one or more relatively small candidate red eye defect regions are applied in response to acquiring said image with an ISO rating greater than 800.

11. One or more non-transitory processor readable media having code embedded therein for programming one or more processors to perform a method for digital image red eye defect detection, wherein the method comprises:
   identifying one or more relatively large candidate red eye defect regions in at least a portion of an acquired digital image, including using a first red eye detector not configured to detect one or more relatively small candidate red eye defect regions;
   applying anti-face detection to at least a portion of said image not including said one or more relatively large candidate red eye defect regions to eliminate non-face regions; and
   identifying said one or more relatively small candidate red eye defect regions both (a) with a second red eye detector configured to detect said one or more relatively small candidate red eye defect regions, and (b) in a portion of said image including neither (i) said eliminated non-face regions nor (ii) said one or more relatively large candidate red eye defect regions.

12. The one or more non-transitory processor readable media of claim 11 wherein the identifying is carried out on a sub-sampled version of said image.

13. The one or more non-transitory processor readable media of claim 12 wherein the identifying further comprises applying relatively more rigorous face detection, compared to said applying face detection, to confirm said one or more large candidate red-eye defect regions.

14. The one or more non-transitory processor readable media of claim 13 wherein said applying face detection comprises applying relatively relaxed face detection to said at least a portion of said image compared with said applying relatively rigorous face detection.

15. The one or more non-transitory processor readable media of claim 14 wherein said applying relatively relaxed face detection comprises applying a chain of about two classifiers to said at least a portion of said image.

16. The one or more non-transitory processor readable media of claim 14 wherein said relatively relaxed face detection has a false positive rate of approximately 40%.

17. The one or more non-transitory processor readable media of claim 14, wherein the applying relatively relaxed face detection comprises comparing a variance of at least a portion of the image with a threshold and responsive to the variance being less than the threshold, eliminating the portion.

18. The one or more non-transitory processor readable media of claim 11 further comprising correcting said relatively large candidate red eye defect regions and said relatively small candidate red eye defect regions.

19. The one or more non-transitory processor readable media of claim 11 wherein the applying anti-face detection comprises applying an anti-face detector to said image to identify those regions of the image which do not contain faces and labelling the remaining regions of the image as candidate face regions.

20. The one or more non-transitory processor readable media of claim 11, further comprising determining to apply the identifying one or more relatively large candidate red eye defect regions, applying anti-face detection and identifying one or more relatively small candidate red eye defect regions are applied in response to acquiring said image with an ISO rating greater than 800.

21. A digital image acquisition device, comprising:
   a lens and image sensor for acquiring digital images;
   a processor;
   a memory having processor readable code embedded therein for programming the processor to perform a method for digital image red eye defect detection, wherein the method comprises:
   acquiring a digital image;
   identifying one or more relatively large candidate red eye defect regions in at least a portion of said image, including using a first red eye detector not configured to detect one or more relatively small candidate red eye defect regions;

applying anti-face detection to at least a portion of said image not including said one or more relatively large candidate red eye defect regions to eliminate non-face regions; and identifying said one or more relatively small candidate red eye defect regions both (a) with a second red eye detector configured to detect said one or more relatively small candidate red eye defect regions, and (b) in a portion of said image including neither (i) said eliminated non-face regions nor (ii) said one or more relatively large candidate red eye defect regions.

22. The device of claim 21 wherein the identifying is carried out on a sub-sampled version of said image.

23. The device of claim 22 wherein the identifying further comprises applying relatively more rigorous face detection, compared to said applying face detection, to confirm said one or more large candidate red-eye defect regions.

24. The device of claim 23 wherein said applying face detection comprises applying relatively relaxed face detection to said at least a portion of said image compared with said applying relatively rigorous face detection.

25. The device of claim 24, wherein said applying relatively relaxed face detection comprises applying a chain of about two classifiers to said at least a portion of said image.

26. The device of claim 24, wherein said relatively relaxed face detection has a false positive rate of approximately 40%.

27. The device of claim 24, wherein the applying relatively relaxed face detection comprises comparing a variance of at least a portion of the image with a threshold and responsive to the variance being less than the threshold, eliminating the portion.

28. The device of claim 21, wherein the method further comprises correcting said relatively large candidate red eye defect regions and said relatively small candidate red eye defect regions.

29. The device of claim 21, wherein the applying anti-face detection comprises applying an anti-face detector to said image to identify those regions of the image which do not contain faces and labelling the remaining regions of the image as candidate face regions.

30. The device of claim 21, wherein the method further comprises determining to apply the identifying one or more relatively large candidate red eye defect regions, applying anti-face detection and identifying one or more relatively small candidate red eye defect regions are applied in response to acquiring said image with an ISO rating greater than 800.

31. A digital image acquisition device, comprising:
a lens and image sensor for acquiring digital images;
a processor;
a first red eye detector configured to program the processor to identify one or more relatively large candidate red eye defect regions in at least a portion of said image, and not configured to detect one or more relatively small candidate red eye defect regions;
an anti-face detector configured to program the processor to apply face detection to at least a portion of said image not including said one or more relatively large candidate red eye defect regions to eliminate non-face regions; and
a second red eye detector configured to program the processor to identify said one or more relatively small candidate red eye defect regions in a portion of said image including neither (a) said eliminated non-face regions nor (b) said one or more relatively large candidate red eye defect regions.

32. The device of claim 31, wherein the first red eye detector is configured to operate on a sub-sampled version of said image.

33. The device of claim 32, further comprising a second face detector configured to apply relatively more rigorous face detection than said anti-face detector to confirm said one or more large candidate red-eye defect regions.

34. The device of claim 33, wherein said anti-face detector is configured to apply relatively relaxed face detection to said portion of said image compared with said second face detector.

35. The device of claim 34, wherein said anti-face detector is configured to apply a chain of approximately two classifiers to said portion of said image.

36. The device of claim 34, wherein said anti-face detector is configured to have a false positive rate of approximately 40%.

37. The device of claim 34, wherein the anti-face detector is configured to compare a variance of a same or different portion of the image with a threshold and responsive to the variance being less than the threshold, eliminating the portion.

38. The device of claim 31, wherein the device is configured to correct the relatively large candidate red eye defect regions and the relatively small candidate red eye defect regions.

39. The device of claim 31, wherein the anti-face detector is configured to label regions that the anti-face detector does not eliminate as candidate face regions.

40. The device of claim 31, wherein the device is configured to determine to apply the first red eye detector, the anti-face detector and the second red eye detector in response to acquiring said image with an ISO rating greater than 800.

* * * * *